(12) United States Patent
Fehrmann et al.

(10) Patent No.: US 6,318,463 B1
(45) Date of Patent: Nov. 20, 2001

(54) SLICKLINE FLUID INDENTIFICATION TOOL AND METHOD OF USE

(75) Inventors: Gary Zane Fehrmann, Lafayette, LA (US); Pascal Menand, Gernain St Maurice (FR)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/405,929

(22) Filed: Sep. 24, 1999

(51) Int. Cl.$^7$ .............................. E21B 47/00; E21B 47/04
(52) U.S. Cl. .................. 166/250.03; 166/254.2; 166/66; 73/152.17
(58) Field of Search .................. 166/250.01, 250.03, 166/254.1, 254.2, 66; 73/152.02, 152.17, 152.18

(56) References Cited

U.S. PATENT DOCUMENTS

| | | | |
|---|---|---|---|
| 3,306,102 | * | 2/1967 | Lebourg .............................. 73/152.05 |
| 5,377,540 | * | 1/1995 | Songe, Jr. et al. ................. 73/152.02 |
| 5,495,755 | * | 3/1996 | Moore ............................... 73/152.02 |
| 5,749,417 | * | 5/1998 | Delatorre ........................... 166/254.2 |
| 5,767,680 | * | 6/1998 | Torres-Verdin et al. ............. 324/355 |
| 5,850,879 | * | 12/1998 | Smith ............................... 166/250.01 |

OTHER PUBLICATIONS

Otis Engineering Corporation, The Wireline Tool String, Excerpt from Otis Engineering Corporation Catalogue, 1989, pp. 1–3 & 9–11, Otis Engineering Corporation, Dallas, TX, U.S.A.

Halliburton Company, CollarTrak™ Slickline Collar Locator, Excerpt from Halliburton Company Catalogue, 1997, Halliburton Company, U.S.A.

Halliburton Company, Advanced Measurement System, Excerpt from Halliburton Company Catalogue, 1997, Halliburton Company, U.S.A.

Halliburton Company, Slickline Data/Job Logger, Excerpt from Halliburton Company Catalogue, 1997, Halliburton Company, U.S.A.

* cited by examiner

Primary Examiner—David Bagnell
Assistant Examiner—Jennifer R. Dougherty
(74) Attorney, Agent, or Firm—Paul I. Herman; David W. Carstens (57) ABSTRACT

Initially, signals relating to well bore fluids that are generated from sensors in presently available down-hole logging tools are analyzed and/or interpreted by an electronic circuit in a well logging tool. The interpretation of these signals can be direct, differential, or summation measurements from the sensors. The signal interpretations can be qualitative or quantitative, depending on how the tool is set up or programmed of the electronic circuit. When gas/oil, gas/water, or oil/water contacts are made in the well bore, the circuit will send a signal to a set of electromagnets or a drag mechanism that will momentarily grab the walls of the pipe. This will create a line tension spike on the load cell/weight indicator on the surface, and a well log can be generated to show where these line tension spikes occur, thus indicating the depth of various fluids in the well bore. The electronic circuit in the well logging tool may be programmed utilizing software and or firmware to determine specific fluids in a well bore. The programming criteria may be to look only for gas/oil, gas/water, or oil/water contacts, or to look specifically for a combination of these various fluid levels in a well bore. If multiple fluid level indications are desired, the circuit will send signals to the electromagnets to engage and remain engaged for longer periods of time for each type of fluid level. Also, various fluid levels can be distinguished by having electromagnets turn on several times after the fluid level is encountered.

11 Claims, 11 Drawing Sheets

SLICKLINE FLUID INDENTIFICATION TOOL AND METHOD OF USE

BACKGROUND OF THE INVENTION

1. Technical Field

The present invention relates to the technology of electronic well logging. More particularly, the present invention relates to determining or identifying fluid means in a well bore using electronic logging instruments. Still more particularly, the present invention relates to a method and apparatus for identifying a fluid in a well bore using a slickline logging instrument.

2. Description of the Related Art

Figures 1A, 1A, 1B:
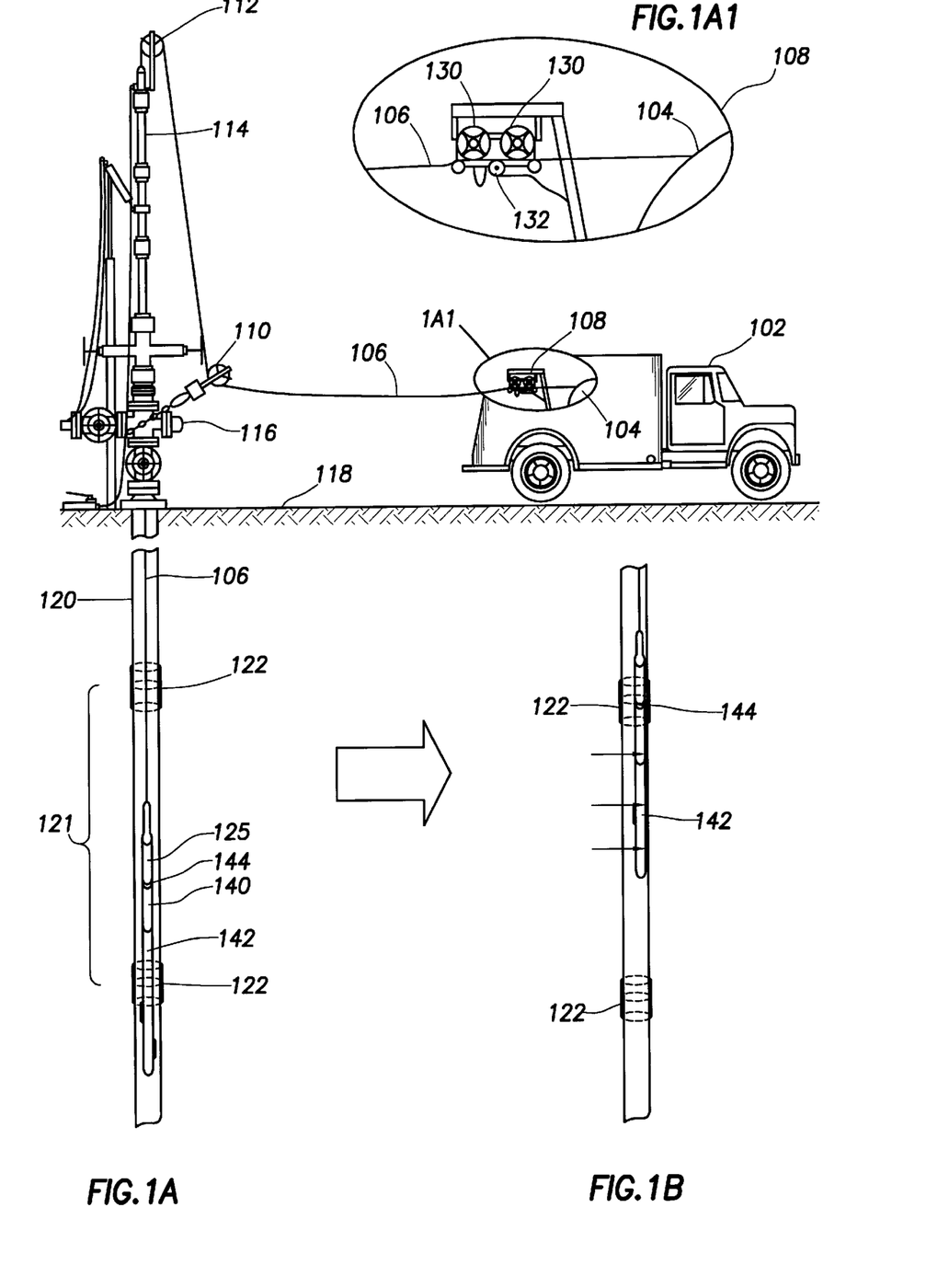

FIG. 1A is an illustration of a standard rig-up for performing down-hole logging operations in a well bore. Generally, logging is performed by a logging services truck 102. Although truck 102 typically contains a number of different features, for this application, truck 102 contains drum 104, which spools off cable 106 through a combination measuring device weight indicator 108, which will be described in more detail below. Cable 106 is rigged through lower sheave wheel 110 and upper sheave wheel 112, and enters the well bore through pressure control equipment 114, used to contain well bore pressure while allowing a cable to move freely in and out of the well bore. Cable 106 enters the well bore at well head connection 116, upon which pressure control equipment is connected. Below surface 118, pipe or casing 120 proceeds in a generally vertical direction to a bottom depth (not shown). Within casing 120 is logging tool 125, connected to cable 106. Casing 120 is a group of casing joints 121, generally 40 to 44 feet long, connected by casing collar 122 and cemented into place in a previously drilled bore hole.

One of the most important measurements provided by a logging truck is the depth measurement. Accurate depth measurements are essential in properly evaluating the well bore. Combination measuring device weight indicator 108 consists of at least one, but normally a plurality of measure wheels 130. The Advanced Measurement System for slickline is an example of such a device used by the Halliburton Company, 3600 Lincoln Plaza, 500 N. Akard St., Dallas, Tex. 75201. Measure wheels 130 are precision ground to a precise diameter, and turn proportionally with cable 106 as it goes into and out of the well bore. Measure wheels 130 are mechanically connected to a depth encoder device (not shown) that provides digital signals based on the position of the depth wheel. Thus, as cable 106 moves into and out of the hole, a plurality of depth signals are sent into the logging compartment of truck 102 in order to provide the operator with accurate digital depth data. Additionally, combination measuring device weight indicator 108 contains cable tension wheel 132. Cable tension wheel 132 applies a set amount of pressure against cable 106, in the direction of measure wheels 130. As the amount of cable in the well bore increases, the tension applied by the weight of the cable resists against cable tension wheel 132, causing the load on cable tension wheel 132 to increase toward measure wheels 130. Cable tension wheel 132 is mechanically connected to a load cell, and as the weight of cable 106 increases, causing the load on tension wheel 132 to increase, the load cell sends a signal into the logging compartment of truck 102, indicating an increase in the tension on cable 106.

Generally, down-hole or well logging can be divided into two categories: wireline logging, and slickline logging. Wireline logging allows for more sophisticated services and tools to be run in the well bore. Wireline cable is a braided cable which, at its center, contains one or more electrical conductors. These conductors pass electrical signals to and from logging tool 125, along with the power needed to operate the down hole components of logging tool 125. Conversely, a slickline may be a braided line but contains no electrical conductors. Therefore, services normally run by a slickline logging unit are generally mechanical in nature and usually do not transmit a signal up-hole, as slickline cable lacks any conductor means for transmitting electrical signals containing data information. However, there are exceptions.

The logging operation pictured in FIG. 1A is that of a collar locator. Logging tool 125 is divided into two sections. The first, collar locator 140, emits a magnetic field and detects the interference with the magnet field caused by a casing collars. A casing collar location signal is then transmitted from casing collar 140. The second section, lower electronic magnet/drag sub-assembly 142, responds to the casing collar location signal transmitted by casing collar 140 by instantaneously activating an electromagnet.

Normally, logging operations proceed as the logging tool moves in an up-hole direction. By logging in the up direction, accurate depth measurements can be maintained because the tension at logging tool 125 remains relatively constant, even though the tool may be scraping along the side of casing 120. Alternatively, if logging in the down-hole direction, logging tool 125 may intermittently drop and drag as it makes its way down casing 120. Because the only tension applied to logging tool 125 in the down-hole direction is due to gravity, or the weight of the logging tool itself, depth measurements in the down-hole logging direction tend to be far less accurate.

Note that cable 106 has a slight amount of slack in it between truck 102 and lower sheave wheel 110. Although not shown, the amount of tension from upper sheave wheel 112 to logging tool 125 also contains a certain amount of slack. The amount of slack varies from time to time due to logging tool 125 hanging up on the well bore in downhole logging operations, causing inaccurate depth measurement readings at the logging compartment. Conversely, the amount of slack between logging tool 125 and truck 102 (and in the well bore) remains relatively constant while logging in the up-hole direction, because cable tensions is driven by the cable winch at the logging truck rather than by gravity. Depth measurements are much more accurate. Therefore, the preferred method for logging is in the up-hole direction.

Another problem more commonly associated with slickline operations is the problem of line or cable stretch. While all cable stretch as tension is added to the cable, slickline cables are generally smaller in diameter and, therefore, the magnitude of the stretch is greater. Some combination depth measurement and cable tension measurement devices, such as the Advanced Measurement System for slickline used by the Halliburton Company, will correct for line stretch and other environmental factors that effect slickline measurements.

As can be seen in FIGS. 1A and 1B, logging tool 125 is moving in the upward direction, and lower electronic magnet/drag sub-assembly 142 is across collar 122. As can be seen in FIG. 1B, as logging tool 125 moves upward, and collar locator measure point 144 comes across the abutment of two joints of pipe within collar 122, collar locator 140 sends a casing collar location signal to lower electronic magnet/drag sub-assembly 142. At that point, magnets within electronic sub-assembly 142 are momentarily activated, and logging tool 125 momentarily sticks to the wall of casing 120. As logging tool 125 sticks to casing 120, tension is increased because the cable winch at logging truck 102 continues turning. An increase in cable tension is detected by combination measuring device weight indicator 108 and can be read on a panel inside logging truck 102.

Figure 2:
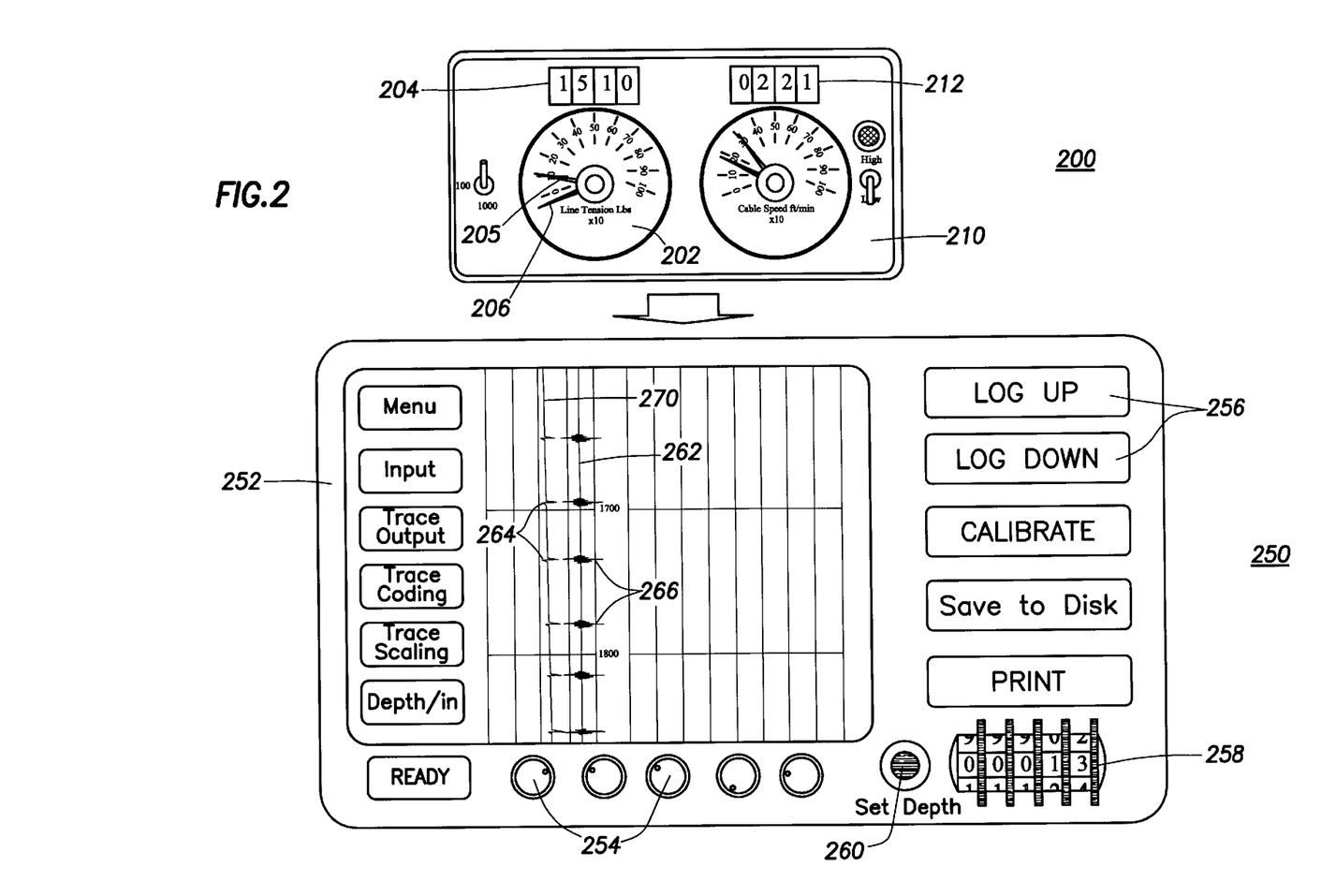
FIG. 2 illustrates two up-hole components that may be found in a typical logging unit.

FIG. 2 illustrates up-hole components that may be found in a typical logging unit, such as that shown in FIG. 1A. Combination cable tension speed device 200 represents a combination tension and speed readout display. Note that line tension is available to the operator in either analog form from cable tension dial 202 or in digital form from cable tension digital readout 204. In this case, the tension is approximately 1510 pounds. Cable tension dial 202 includes tension needle 205 and increment needle 206. Increment needle 206 is scaled at 10 percent of the reading of tension needle 205 or the current cable. In this case, full scale for increment needle 206 is scaled at 151 pounds. Thus, if the logging tool hangs up and tugs or pulls 151 pounds on the cable, the increment needle will move full scale, or to the 100 mark of the cable tension dial 202.

In practice, as a logging tool moves up-hole, if the tool starts to drag, the increment needle moves up at approximately ten times the travel of the weight indicator needle. Thus, the operator is given an immediate and accurate representation of any tugs or pulls, in many cases before an indication is registered on cable tension needle 206. Thus, the operator is given time to react before the tension on the tool head becomes critical.

Also provided on combination tension cable speed device 200 is speed dial 210 and speed digital readout 212, which indicate the speed at which the cable is traveling into or out of the well bore. The cable speed readout gives the operator an accurate cable speed indication for logging operations, as well as a reliable method for gauging logging tool float as the logging tool is lowered into the well bore.

Conventional slickline trucks that only perform mechanical services may only be equipped with a combination line tension cable speed indicator and a depth indicator. However, recent advancements in well logging technology have allowed for the placement of low-cost portable well log computers, such as that shown in FIG. 2. One example is the Slickline Data/Job Logger used by the Halliburton Company. Logging computer 250 contains digital display 252, a number of manual dials 254, and a series of buttons 256, along with a depth-set thumb wheel 258, and a depth-set button 260. Buttons 256 can be used to control data for display on logging computer 250. In general, they include a means for indicating logging sequence (either up or down) and for calibrating the tool or depth equipment, a means to save, and a means to print a representation of the data, normally called a log or an electric log.

The representation of logging computer 250 in display 252 includes a three-track linear logging grid generally referred to as a log. The log consists of one linear grid track on the left, a depth track for displaying depth numbers, such as 1700 and 1800, without grid, and two linear grid tracks on the right. In this particular model, display 252 is a touch panel, allowing for a plurality of buttons to be displayed for configuring the display of the electric log. Typical functions might include a menu function, an input function for identifying the input to the device, a trace output function, along with trace coding and scaling functions for identifying the individual traces in the tracks and coding and scaling the traces, along with a depth scale for identifying how many feet per inch will be displayed on display 252. In this particular example, traces 270 and 262 are shown on the display. Trace 270 is a tension trace of tension received from combination tension cable speed device 200. Note that, at certain intervals, the tension device spikes higher, as shown, for example, at points labeled 264. These points correspond with casing collars 122 in casing 120 from the previous illustration.

Also shown on the log is an example of a wireline casing collar locator 262. It should be understood that rarely, in practice, would a wireline casing collar trace be overlaid on a log generated with a slickline collar locator trace. The present example is provided in order to give a better understanding of the operation of the slickline logging operation. Trace 262 depicts a tracing collar locator log as received from a wireline casing collar locator. Note that the collars are identified by lateral variations of the casing collar locator signal, which culminates in a high magnitude deviation from the base point, indicating a casing collar. These are shown at points 266 on trace 262 and identify the location of casing collars. Note that casing collar locators, identified on the electric log as points 266, correlate perfectly to casing collars 264 on casing collar locator trace 270, as input from this slickline log.

As can be seen in the example, the slickline logging operation that uses a collar locator in combination with a lower magnet/drag sub-assembly provides casing collar identification and depth measurements comparable to the more expensive wireline logging operation. Thus, even though slickline logging operations do not have the means to transmit electrical signals including data information up-hole in real time, the information can instead be transmitted in real time up-hole using the line tension on combination measuring device weight indicator 108. In so doing, a slickline operator can provide the same information as an electric operator, at a fraction of the cost of using an electric line.

Figure 3:
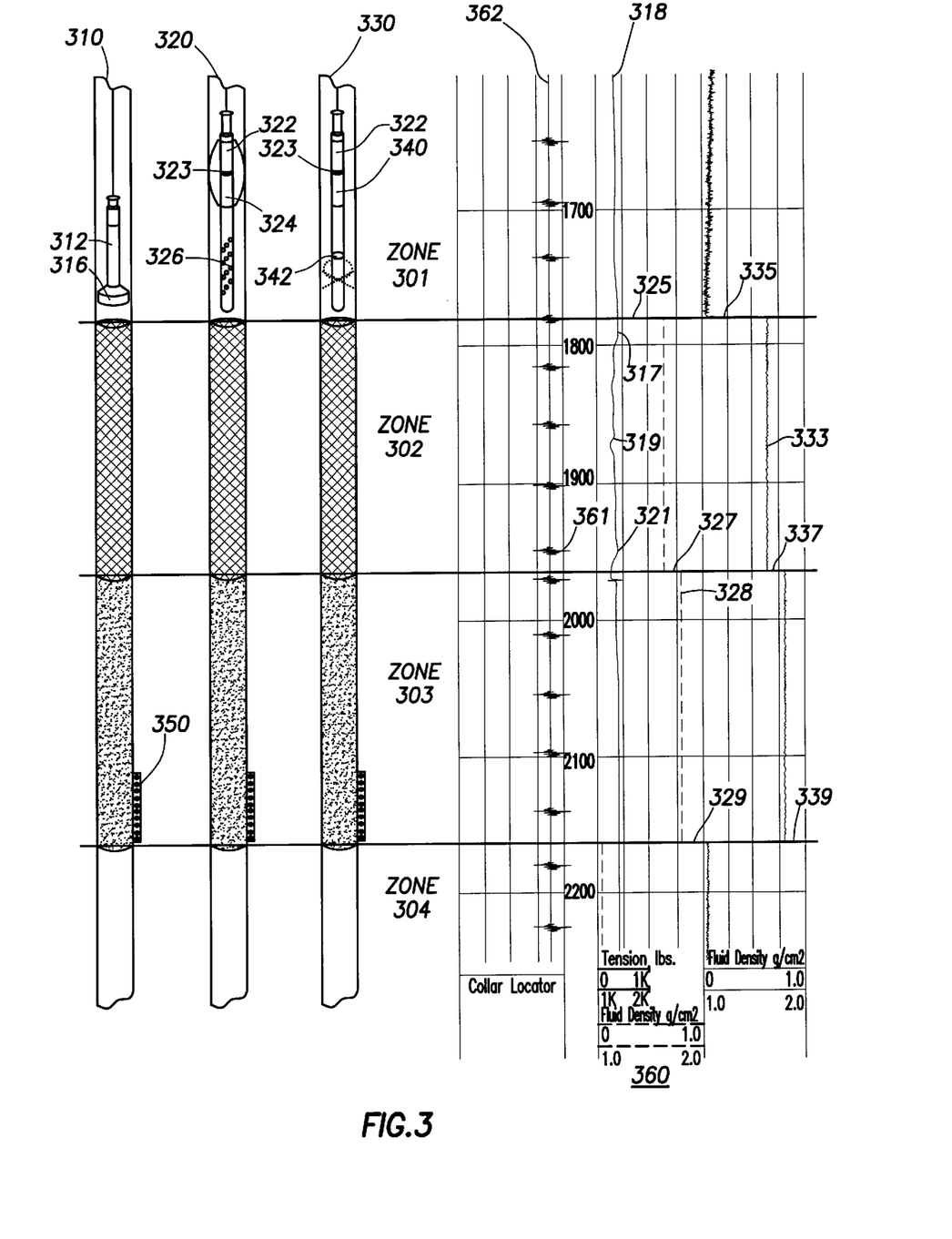
FIG. 3 is a chart illustrating another wireline service performed by both slickline and wireline.

FIG. 3 is a chart illustrating a down-hole logging service of fluid depth determination performed by both slickline and wireline. In FIG. 3, well bores 310, 320 and 330 illustrate the same well bore but show different down-hole logging tools. Although well bores 310, 320 and 330 are disclosed as casing lined, the down-hole logging tools described below may be used in either casing or production tubing for detecting fluid and identifying fluid types. Well bore 310 contains slickline tool 312. Generally, when attempting to identify a fluid level in a well bore using slickline, either a gauge cutter or a blind box is configured at the bottom of slickline tool 312. The gauge cutter resembles a biscuit cutter on the bottom, is hollow in the center with fluid bypasses cut above the cutter, and contains a threaded top end to attach it to the bottom of a slickline tool string. The blind box is a solid piece of steel with a flat smooth bottom and a threaded top end similar to the gauge cutter. The blind box is the preferred tool for locating fluid levels, as it has no fluid bypass through its center.

Blind box 316 is attached to the bottom of slickline tool 312 and run in the hole on slickline at a constant, fairly high rate of speed, approximately 100–200 ft/min. When a fluid level is encountered, a reduction in line speed and loss of weight occurs due to fluid bypass restriction of fluid flow around the tool. When pulling out of the hole at a constant speed, a loss of weight indicates that the tools have been pulled out of a fluid level. As blind box 316 contacts the fluid level in the well bore, the change in cable tension registers on the cable tension display as described above. In the configuration shown in well bore 310, as the cable moves downward and blind box 316 contacts fluid, the logging tool is held up slightly, and the slickline operator can note the top of the fluid column from the weight indicator reading.

Well bores 310, 320 and 330 contain four distinct zones. Zone 301 is the air zone on top of the fluid column. Zone 302 is the lightest fluid contained within the well bore. In this case, it is a combination of oil and soluble gas. Soluble gas makes the oil much less dense than the density of oil, and often a zone of soluble gas and oil form over an oil zone in a well bore. Zone 303 is a column of oil that is separated from zone 302, which contains the soluble gas. Note at the bottom of zone 303 a series of perforations 350, which allow for the communication of the fluids within the well bore to the formation. Normally, perforations such as those shown in the depicted example are made for producing oil in a formation reservoir. A perforating gun is lowered to the desired depth, and the gun is discharged, firing a plurality of shape charges, which penetrate the wall of the casing and the cement behind the casing.

In the depicted example, well bores 310, 320 and 330 have a sump, which is that portion of the well bore below the bottom perforation, in this case, zone 304. Normally, the sump contains a reservoir or formation water, but it also may contain contaminated well bore drilling fluids, such as mud and other debris. Typically, in a producing well, or even in an injection well, the sump will contain reservoir water, which is usually saline water of somewhat higher density than fresh water. While using slickline logging tool 312 may provide valuable information as to the top of the fluid column in the well bore, slickline logging tool 312 has problems identifying fluid types and, in many instances, has problems identifying the exact depth of even the fluid column itself.

Well bore log 360 shows a plurality of traces, including tension trace 318, which might be expected from a slickline operation for determining a fluid column using a blind box, as shown in the depicted example. Notice the tool travels downward in well bore 310. Tension trace 318 stays relatively straight and maintains a gradient related to the additional weight of the cable going in the hole. In this case, the fluid level is at approximately 1785 feet, as indicated at point 345. Note that, as tension trace 318 crosses the interface between zone 301 and zone 302, the tension trace remains relatively stable for approximately six feet. At that depth, approximately 1791 feet, the tension gradually reduces until, at approximately 1800 feet, tension trace 318 again stabilizes and again remains relatively flat for a number of feet. Note at a depth of about 1870 feet, at point 319, the tension trace is again reduced momentarily through the interval of about eight feet. Still further down, at the interface of zone 302 and zone 303, tension trace 318 once again is slightly reduced at point 321, for an interval of about ten or twelve feet.

At first appearance of trace 318, an operator might wrongly conclude that three separate fluid types have been detected: one at point 317, one at point 319, and one at point 321. Careful examination by an experienced well logger would reveal that point 317 is indeed a contact with a fluid top. However, note that even the highest reading of point 317 is about six feet off the mark of the fluid top in well bore 310. Note also that, at point 319, where tension trace 318 momentarily lags or reduces, the entire tension comes back. While this could indicate a fluid level, it could also indicate debris in the hole being pushed down by slickline tool 312.

More difficult to detect, at point 321, is another reduction in tension trace 318. While this point roughly correlates to the interface between zones 302 and 303, by comparing tension trace 318 to collar locator trace 362, it is apparent that what has actually happened is, blind box 316 has hung up on a casing collar directly above point 328. Once sufficient cable slack was spooled into the hole, slickline tool 312 fell past collar 361, and tension trace 318 resumed its normal down-hole gradient.

Well bore 320 shows the identical well bore, but this time containing wireline logging tool 322. Wireline logging tool 322 is a combination of the collar locator and the fluid density measuring device, sometimes known as gradio-monometer 326. Gradio-monometer 326 uses a plurality of pressure sensors for determining an exact fluid density. On collar locator 324 is the measure point 323, used for identifying the depth of the casing collars. Unlike slickline tool 312, wireline tool 322 would normally log in the up-hole direction and produce fluid density trace 350. Note that fluid density trace 350 contains three separate fluid density changes. The first is at point 325, where the tool moves from the top fluid to air (zone 301 to 302). In this case, the density of the top fluid is approximately 0.70 to 0.75 gm/cc, and the air dropped down to around zero. This correlates exactly to the interface between zones 301 and 302.

Further down, at the interface between zones 302 and 303, is another point, point 327. Fluid density trace 350 shows a density change from approximately 0.80 or 0.85 gm/cc to 0.70 to 0.75 gm/cc. In this case, the density of the crude oil of zone 303 is approximately 0.80 to 0.85 gm/cc. Note also that wireline logging tool 322 has detected the exact point at which zone 302 interfaces zone 303, unlike the slickline logging tool.

Finally, fluid density trace 350 shows the exact interface between zones 303 and 304, precisely at the bottom of the perforations, as would be expected. Note also that, at that point, the density changes from that of crude, around 0.80 to 0.85 gm/cc, to that of salt water or contaminated salt water, just over 1.0 gm/cc, roughly 1.05 gm/cc in the depicted example. As can be seen, wireline gradio-monometer 326 provides much better fluid identification information; but also, it provides more accurate depth information because, one, the tool logs in the up-hole direction and, two, the tool responds to only fluid densities or changes in fluid density, unlike blind box 316 on slickline logging tool 312, which responds to the fluid tops but also responds to junk or debris in the hole, deformed hole and casing collar locators, and also perforations or other protrusions, which may hang up blind box 316 on its travel down the hole.

Well bore 330 depicts an alternative to using gradio-monometer 326. Wireline logging tool 340 is similar to that described immediately above, in that it contains casing collar locator 322 with measure point 323. However, rather than using gradio-monometer 326, wireline logging tool 340 uses a radioactive or nuclear type fluid density sensor. It is well known to obtain the approximate density of rock and fluids by bombarding the fluid or rock with radiation and using a radiation detector measuring the amount of radiation that is allowed to pass through either the fluid or matrix rock. One means uses a gamma ray source, such as cesium, radium or cobalt, and one or two gamma ray electors, which measure the amount of gamma ray particles that find their way through the fluid to the gamma ray detector. The fluid density differential pressure tool (densometer) is one example of such a tool used by the Halliburton Company.

In another embodiment, a neutron source could be provided, such as americium-beryllium, and the radiation detectors would then detect the number of free neutrons that pass through the fluid and strike the detector. Function formers are used to calculate the number of counts per second perceived by one or both detectors in a given fluid type, and in a given fluid type of a given density. Using wireline logging tool 340, not only an accurate measurement of the density can be determined; but also, in many cases, the fluid type in the well bore can also be determined with certainty.

Fluid density trace 333 in track three of log 360 is produced by a radioactive fluid density tool. Note that, in zone 301, fluid density trace 333 exhibits a certain amount of random activity, as expected with a radioactive source logging tool. At the interface of zone 301 and zone 302, the density immediately proceeds to show an oil and gas density of around 0.70 to 0.75 gm/cc, similar to that measured by the gradio-monometer. Note also that, at point 335, the depth of the fluid top is determined exactly, unlike the fluid top that is determined by slickline tool 312. At point 337, fluid density trace 333 indicates a change in density from approximately 0.70 to 0.75 gm/cc to approximately 0.80 to 0.85 gm/cc. Note also that the depth of point 337 corresponds to the depth at which zone 302 interfaces with zone 303. Finally, at point 339, fluid density trace 333 detects an increase in fluid density from approximately 0.80 to 0.85 gm/cc to approximately 1.00 to 1.05 gm/cc, indicating that the tool has passed from zone 303, containing crude oil and the sump, to zone 304, containing contaminated well water fluids including formation water.

Alternatively, a capacitance tool, which indirectly relates the capacitance of a fluid to its specific gravity, may be used to identify fluids and fluid levels. This tool is used primarily to distinguish if a fluid is an oil or water. This tool is normally run in conjunction with a fluid density differential pressure tool, which utilizes a source to determine if a fluid is a gas or liquid. When used in conjunction with each other, these tools can determine gas, oil, and water contacts. In fact, most production logging operations employ a number of tools in combination in order to provide the well operator with a definitive answer as to fluid type or phase, and fluid contact levels.

As can be seen, accurate fluid levels can be determined by any number of tools in a wireline operation. However, fluid level determination using wireline is expensive. Generally, mechanical services, such as identifying fluid tops and gauging holes, have relatively low priority in the well life and, therefore, very little funds are allocated for these services. Slickline operations partially meet the needs of the well operators; however, the accuracy and limitations of the tools are suspect. While well operators may be getting some information, they may not be getting all of the necessary information; and some of the information may be inaccurate.

Therefore, it would be advantageous to provide a slickline operation for determining accurate fluid level depths. It would be further advantageous to provide a tool for identifying multiple intervals on a slickline. It would be even more advantageous to provide a down-hole tool for use in slickline operations which obtains real-time fluid identifications in multi-fluid well bores.

SUMMARY OF THE INVENTION

The present invention relates to a method and apparatus for more accurately locating and identifying static fluid levels in a well bore utilizing slickline service techniques. The present invention allows for fluid contact identification using a variety of fluid identifying sensors. This invention couples the use of these sensors with an electronic circuit that analyzes and interprets the signals from the sensors. The interpretation of these signals can be direct, differential, or summation measurements from the sensors. The signal interpretations can be qualitative or quantitative, depending on how the tool is set up or programmed. When gas/oil, gas/water, or oil/water contacts are made in the well bore, the circuit sends a signal to a set of electromagnets or a drag mechanism that will momentarily grab the walls of the pipe. This creates a line tension spike on the load cell/weight indicator on the surface. When the load cell is coupled to a Data/Job Logger and Advanced Measurement System, a graphical chart (depth log) can be generated to show where these line tension spikes occur, thus indicating the depth of various fluids in the well bore. The tool may be programmed utilizing software and or firmware to determine specific fluids in a well bore. The tool may be programmed to look only for gas/oil, gas/water, or oil/water contacts, or to look specifically for a combination of these various fluid levels in a well bore. If multiple fluid level indications are desired, the circuit sends signals to the electromagnets to engage and remain engaged for longer period of time for each type of fluid level. Also, various fluid levels can be distinguished by having electromagnets turn on several times after the fluid level is encountered.

BRIEF DESCRIPTION OF THE DRAWINGS

A more complete understanding of the method and apparatus of the present invention may be had by reference to the following detailed description when taken in conjunction with the accompanying drawings, wherein:

FIGS. 1A, 1A1 and 1B are illustrations of a standard rig-up for performing electronic logging operations in a well bore;

DETAILED DESCRIPTION OF THE DRAWINGS

In slickline service operations, it is sometimes desirable to identify fluid levels in oil and gas wells. Some applications include:

1. Monitoring fluid levels in gas storage or observation wells to determine useable gas in place.
2. Determining fluid levels in wells to help calculate static bottom hole pressures.
3. Determining which valve is the operating valve in a gas lifted well by finding the fluid level in the well.

As discussed above, current methods employed utilizing slickline require the use of a gauge cutter, blind box, or other tool that takes up the majority of the interior diameter (ID) of the production tubing or casing. An experienced slickline operator makes several up and down passes with the tool string at various speeds through the interval to determine exactly where the fluid level is located in the well bore. The operator observes the weight indicator and depth indicator on the unit to pinpoint the depth of the fluid level. This is normally a gas and oil contact, or gas and water contact. The accuracy of fluid depth location utilizing the above mentioned method is limited and highly dependent on the skill of the operator and the accuracy of the weight indicator and depth indicator. Line stretch can also lead to depth inaccuracies when using this method. In addition, utilizing the above method is limited to finding gas/oil and gas/water contacts. Oil and water contacts are extremely difficult to determine utilizing this method.

In a preferred embodiment of the present invention, a new tool and method to more accurately locate and identify static fluid levels in a well bore utilizing slickline service techniques is disclosed. This tool will accurately indicate the depth of various types of fluids in a well bore, without the need for more costly electrical conductor wireline services. The present invention allows for fluid contact identification using a variety of fluid identifying sensors.

This invention couples the use of these sensors with an electronic circuit that analyzes and interprets the signals from the sensors. The interpretation of these signals can be direct, differential, or summation measurements from the sensors. The signal interpretations can be qualitative or quantitative, depending on how the tool is set up or programmed. When gas/oil, gas/water, or oil/water contacts are made in the well bore, the circuit sends a signal to a set of electromagnets or a drag mechanism that momentarily grabs the walls of the pipe. This creates a line tension spike on the load cell/weight indicator on surface. When the load cell is coupled to a Data/Job Logger and Advanced Measurement System, a graphical chart (depth log) can be generated to show where these line tension spikes occur, thus indicating the depth of various fluids in the well bore.

In a preferred embodiment of the present invention, the tool may be programmed utilizing software and or firmware to determine specific fluids in a well bore. For example, the tool may be programmed to look only for gas/oil, gas/water, or oil/water contacts. Or it may be programmed to look specifically for a combination of these various fluid levels in a well bore. If multiple fluid level indications are desired, the circuit will send signals to the electromagnets to engage and remain engaged for longer periods of time for each type of fluid level. For example, 3 seconds for gas/oil contacts, 5 seconds for gas/water, or 8 seconds for oil/water.

Another, more practical method to distinguish various fluid levels would be to have the electromagnets or magnet/drag subassembly system turn on several times after the fluid level is encountered. For example, for gas/oil, the circuit would turn on the magnet/drag sub-assembly system 3 times after the initial signal, 4 times for gas/water, and 5 times for oil water contacts. The tool may also be set up to identify the specific density of the fluid encountered if a plus tension signal system could be developed for the tool.

Figure 4:
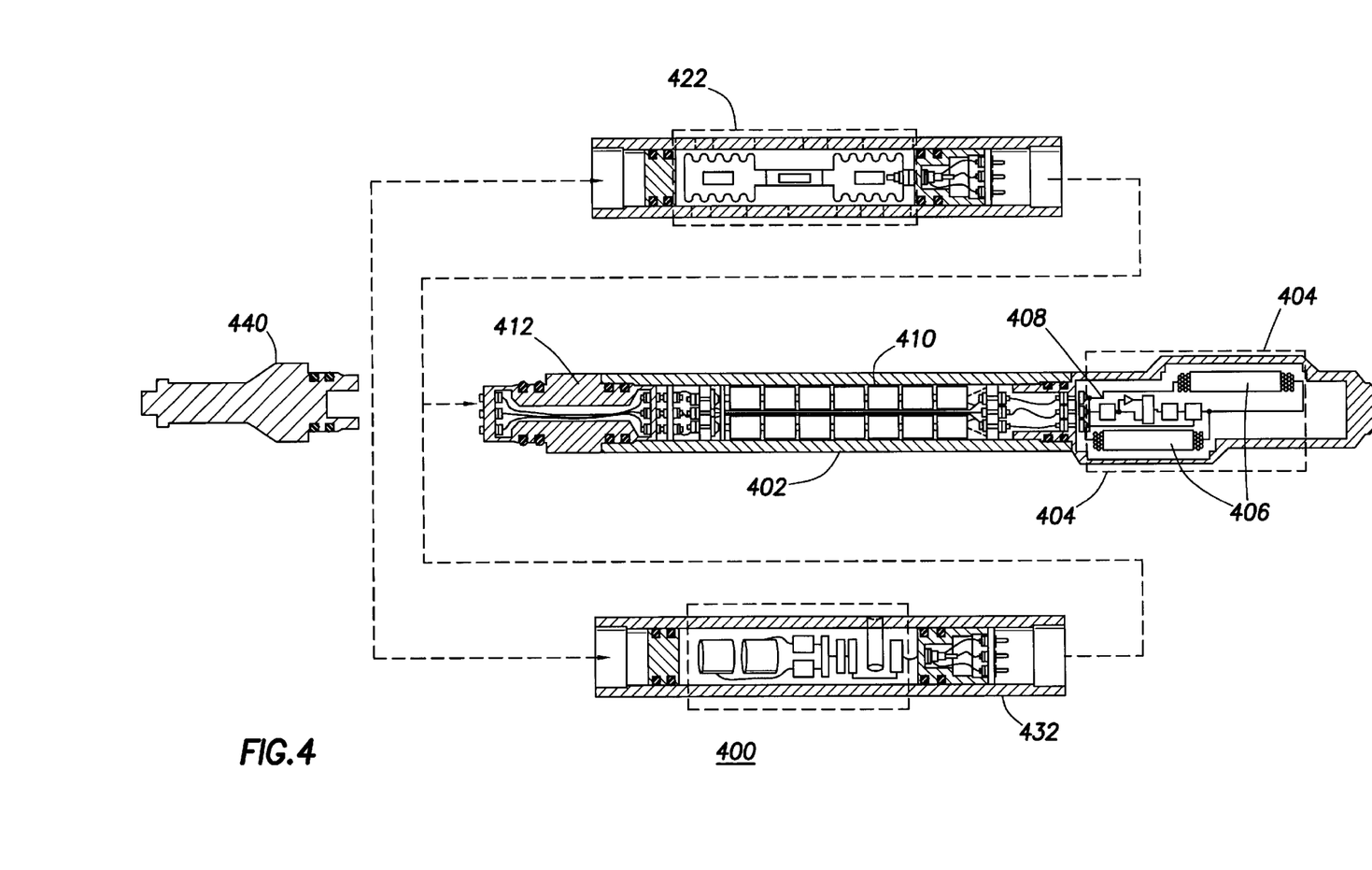
FIG. 4 illustrates a slickline tool that is a combination tool utilizing an electronic magnet/drag subassembly similar to that used in conventional collar locator operations, as is a preferred embodiment of the present invention.

FIG. 4 is an illustration of a preferred embodiment of the present invention. FIG. 4 illustrates slickline tool 400, which is a combination tool utilizing an electronic sub-assembly, a magnet/drag sub-assembly, which may be similar to that used in conventional similar collar locator operations. Magnet/drag sub-assembly 402 contains one or two skids 404, and each may be housing an electromagnet 406. Slickline tool 400 depicts two electromagnets, but one may be used instead. Electronic circuitry within sub-assembly 402 includes triggering means circuitry 408 (which will be discussed later), batteries 410, and adapter assembly 412 for attaching the magnet/drag sub-assembly to other electronic measure means, such as a collar locator. Gradio-monometer 422 provides a means for measuring well bore fluid densities and conveying that information to the electronic control means of magnet/drag sub-assembly 402. Gradio-monometer 422 generally works by comparing hydrostatic pressures at two well depths, spaced a foot or two apart, and dividing the pressure by the depth differential. The result is the average density of the fluid between the upper and lower pressure readings. Gradio-monometer 422 will be described in greater detail below.

Once gradio-monometer 422 is attached to magnet/drag sub-assembly 402, cable head 440 is attached to gradio-monometer 422, and the tool is lowered into the well bore. Alternatively, radioactive density tool 432 may be used to calculate the density of well bore fluid by inserting a radioactive source and measuring the radiation which penetrates the well bore fluid at either one or more detectors above the source. This source may be a chemical source. The particular radioactive particles may, instead, be generated by an ion or neutron generator known in the industry. Radioactive fluid density tool 432 will be described in greater detail below.

Alternatively, a capacitance tool may be used in combination with magnet/drag sub-assembly 402 for indicating fluid contacts and fluid densities. Still further, the above mentioned tools may be combined to form a single slickline tool string using adapter 412 for making tool connections. Conventionally, combination tools require a sophisticated signal transmission scheme in order to eliminate the possibility of one tool's signal interfering with another tool's signal. Such techniques are well known in the art and include state formatting, such as inverting pulsing from one tool as compared to another, synchronous and asynchronous multiplexing, and various standardized protocols designed to allow near simultaneous flow of dissimilar data packets.

Figure 5A:
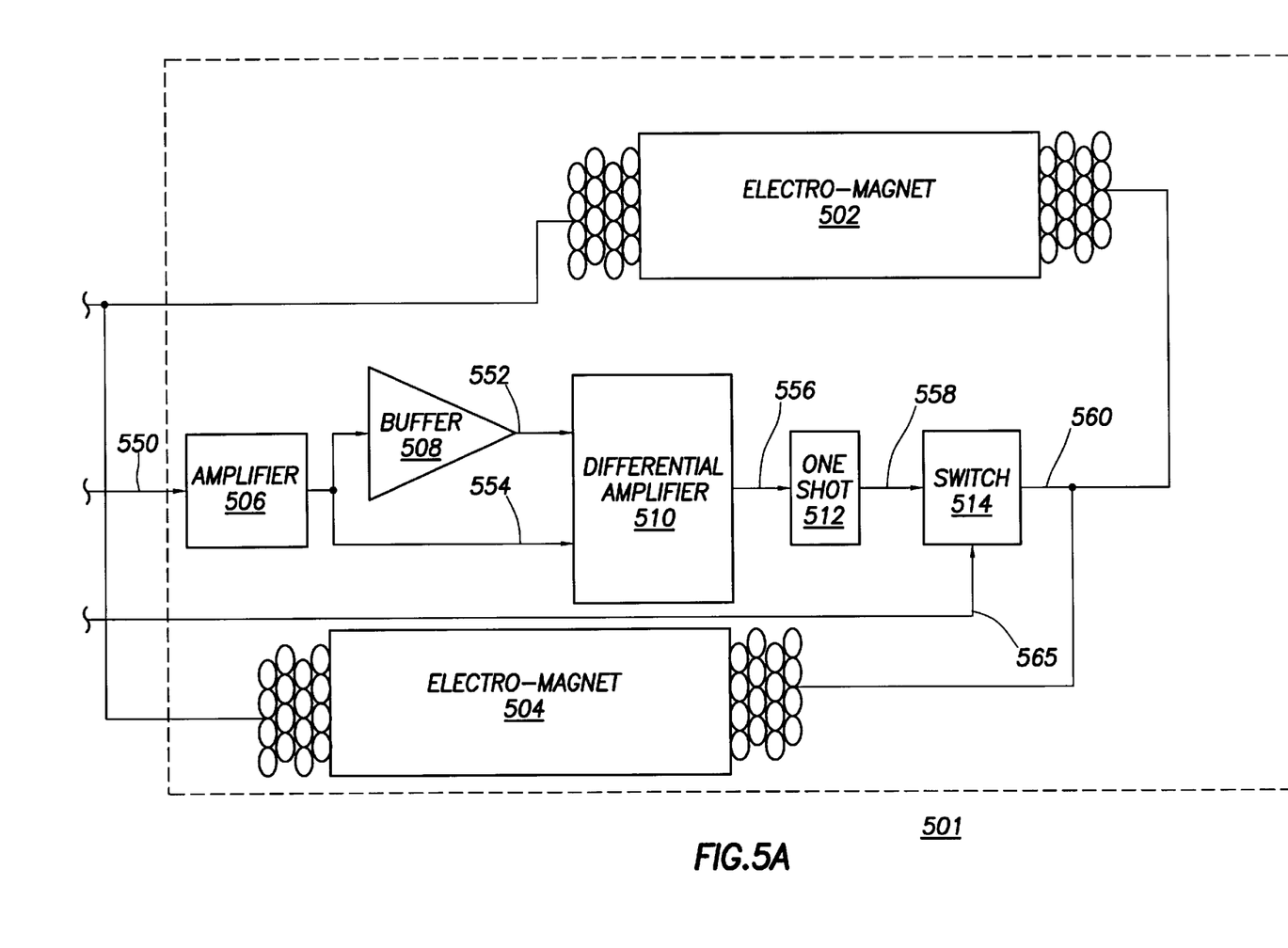
FIG. 5 illustrates the electronic triggering circuit used for engaging the electromagnets on a magnetic/drag subassembly.

FIG. 5A illustrates the electronic triggering circuit used for engaging the electromagnets on magnet/drag sub-assembly 402. Generally, there are two magnets, one at either side of the tool. However, other configurations are possible, such as a torroidial-shaped magnet or doughnut-shaped magnet, which provides magnetic force to each side, 360 degrees around the tool.

In this case, electronic triggering circuit 501 contains two electromagnets, 502 and 504. Electromagnets 502 and 504 are normally in the inactive mode and, thus, exert no magnetic pull whatsoever to the well casing. Signal 550 from one or more of the above-mentioned fluid identification tools is input to amplifier 506. The amplified signal is then spit and sent to buffer 508, where the signal is delayed. Output signal 552 of buffer 508 is fed to differential amplifier 510, along with the output of amplifier 506, signal 554. Differential amplifier 510 compares signal 552 with signal 554 and produces an output when a differential is detected between signals 552 and 554. Differential output 556 is then fed into one shot 512. One shot 512 produces symmetric pulse 558, which is fed to switch 514. Upon receiving pulse 558, switch 514 activates magnets 502 and 504 by allowing battery power 565 to flow from the batteries to the electromagnets. Generally, switch 514 is a time-switch, not allowing power 560 to pass through the switch more than about 300 ms.

Figure 5B:
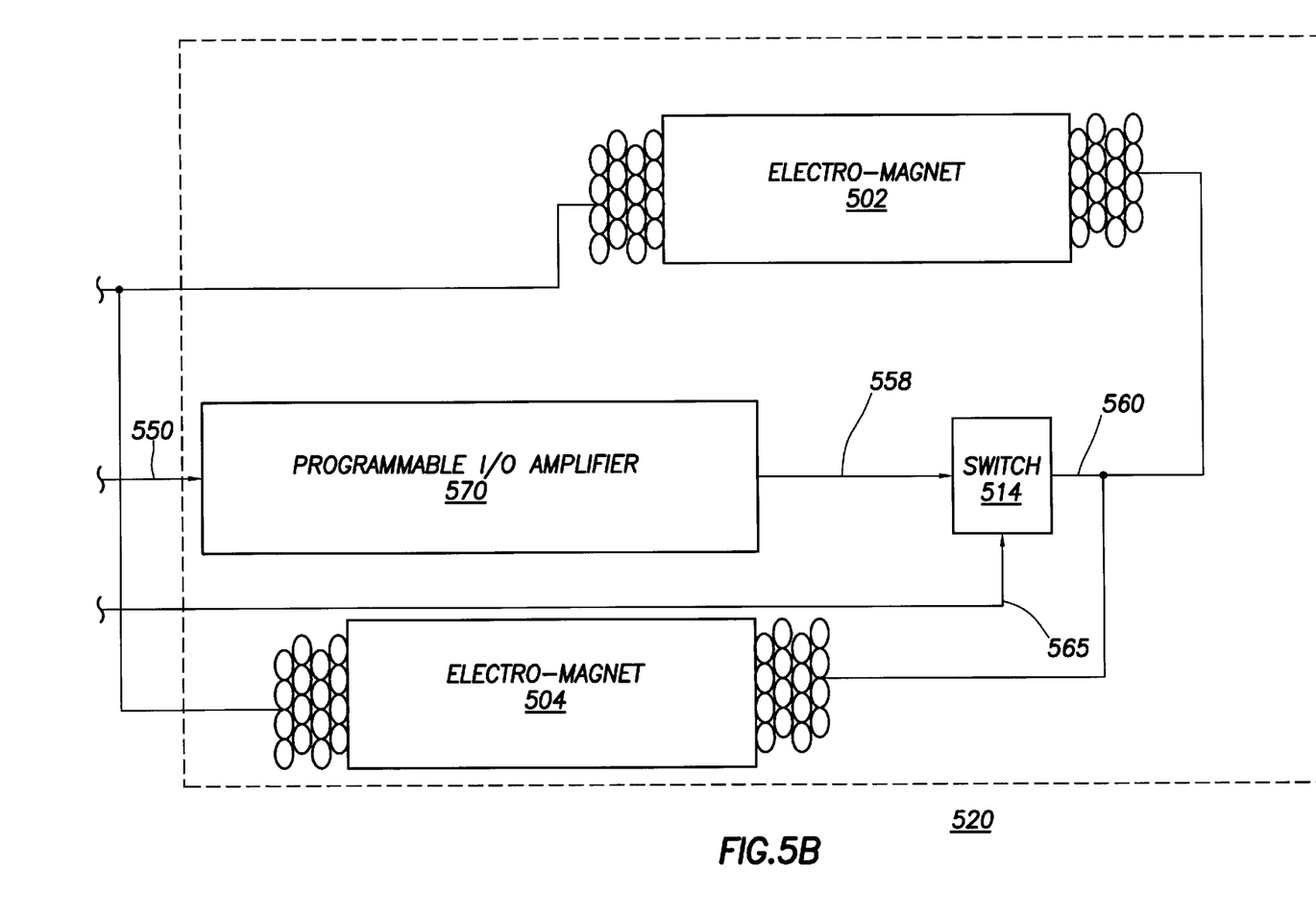

FIG. 5B illustrates the electronic triggering circuit used for engaging the electromagnets on magnet/drag sub-assembly 402 utilizing a programmable I/O amplifier.

In this case, electronic triggering circuit 520 contains two electromagnets, 502 and 504. Electromagnets 502 and 504 are normally in the inactive mode and, thus, exert no magnetic pull whatsoever to the well casing. Signal 550 from one or more of the above-mentioned fluid identification tools is input to programmable I/O amplifier 570. Programmable I/O amplifier 570 includes logic circuitry which analyzes signal 560 and then outputs a control signal 558 to switch 514. Upon receiving pulse 558, switch 514 activates magnets 502 and 504 by allowing battery power 565 to flow from the batteries to the electromagnets. Unlike the above described embodiment, programmable I/O amplifier 570 outputs a unique control signal to switch 514 based on the input signal 550. For example, upon detecting a change in fluid density of 0.1 gram per cc, the programmable I/O amplifier may output a control signal for 100 ms, whereas a change in fluid density of 0.2 gram per cc causes an output control signal for 200 ms up to a full second, for a change of 1.0 gm/cc. Alternatively, programmable I/O amplifier 570 may generate a series of control pulses based on the change in fluid density. Still other embodiments include presetting threshold windows for detecting a specific fluid density, such as water, 1.0 gm/cc, or oil, 0.8 gm/cc, with control pulse widths of cycles. Still other embodiments include programmable I/O amplifier 570 comparing the signal from one tool sensor reading to another tool's signal, to first determining phase such as liquid, gas, or liquid/gas emulsion, and then determining the type of fluid using capacitance, inductance, or resistance measurement.

Production evaluation logging techniques are extremely well developed, and one of ordinary skill in the art could program software, hardware or firmware elements within programmable I/O amplifier 570 in accordance with well known well practices and production logging evaluation techniques.

Figure 6:
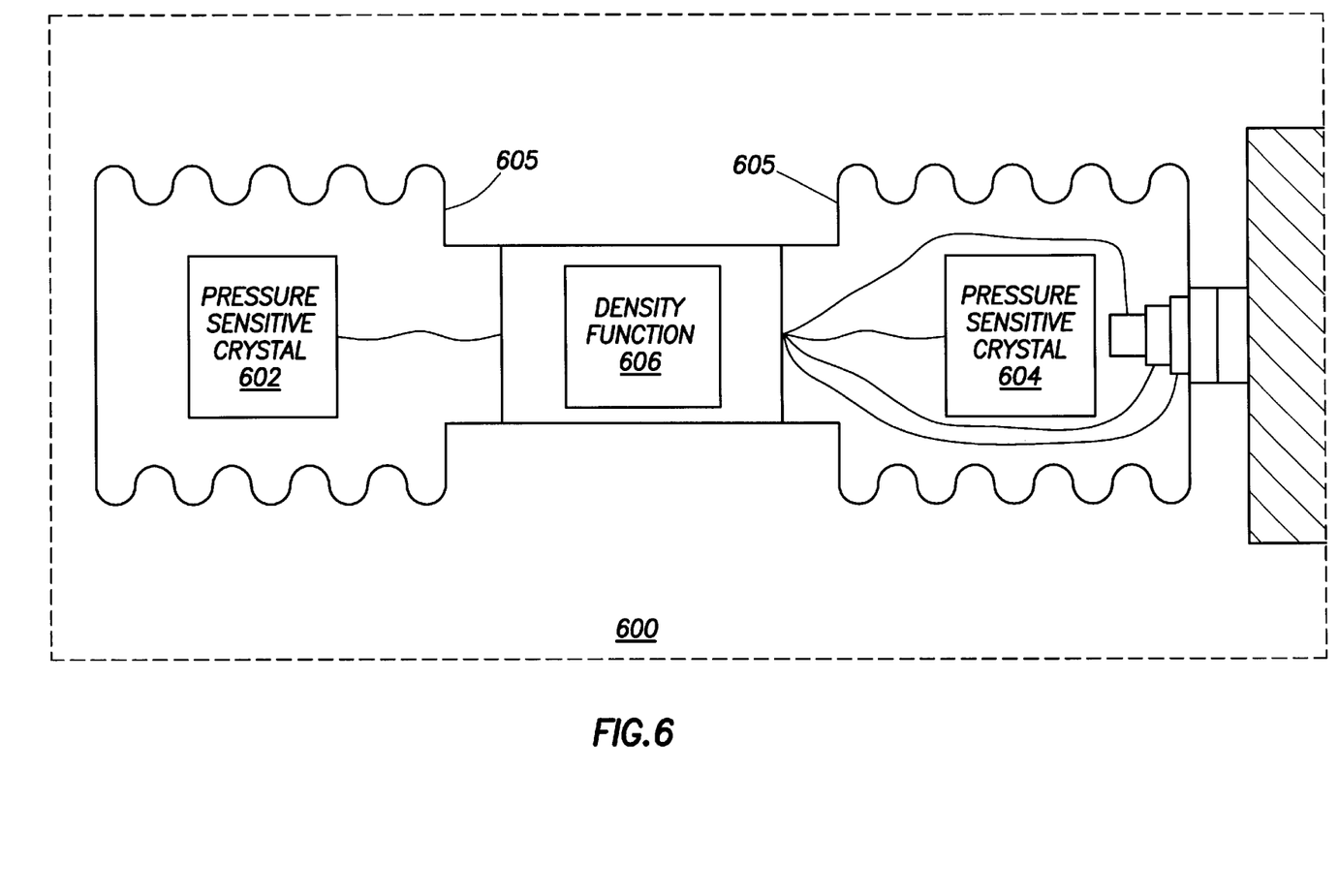
FIG. 6 is a diagram of a basic gradio-monometer tool.

FIG. 6 is a diagram of a basic gradio-monometer tool. Gradio-monometer tool 600 contains two pressure sensitive crystals: upper pressure sensitive crystal 602, and lower pressure sensitive crystal 604. Each of these crystals is housed in collapsible bellows 605. The bellows are generally filled with a pure oil that eliminates any contact between pressure sensitive crystals 602 and 604 from contaminants in the well bore. Electronic density function 606 compares the pressure measured from upper pressure sensitive crystal 602 to that of lower pressure sensitive crystal 604 by dividing the spacing of crystals 602 and 604 by the comparison value, by which an accurate determination of the fluid surrounding the two pressure sensitive crystals can be determined.

Figure 7:
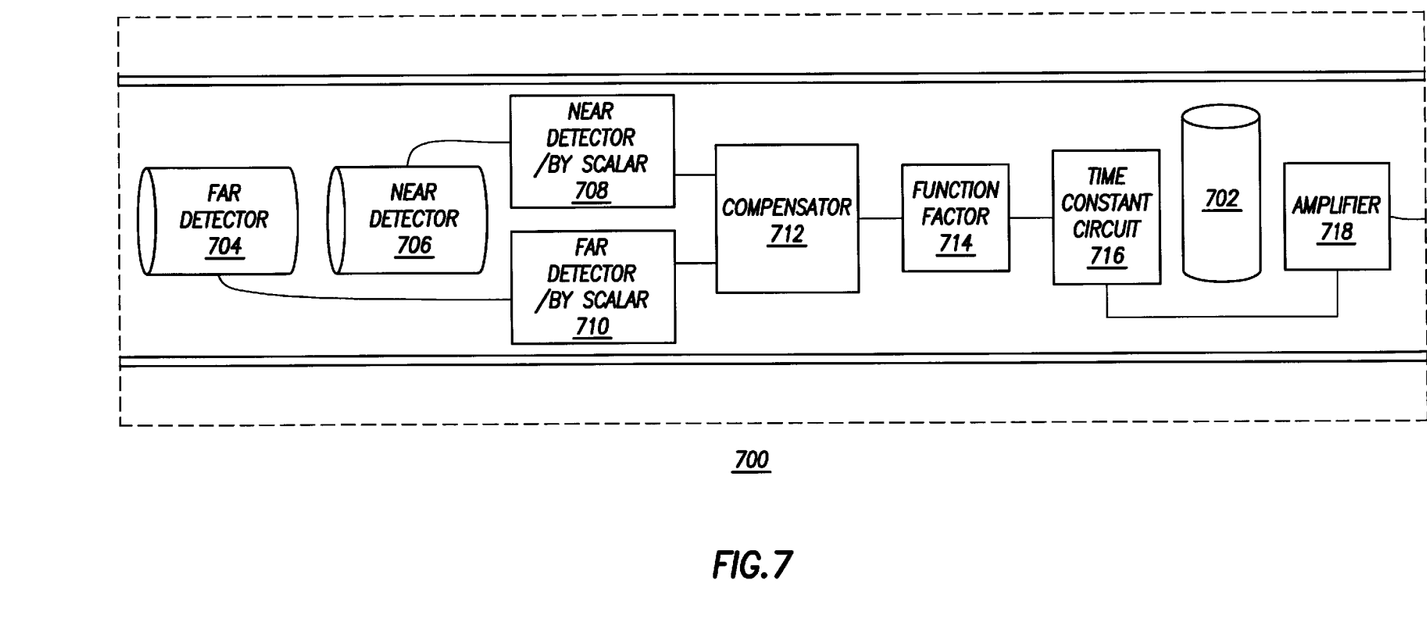
FIG. 7 is a schematic showing a radioactive fluid density tool in accordance with a preferred embodiment of the present invention.

FIG. 7 is a schematic showing a radioactive fluid density tool in accordance with a preferred embodiment of the present invention. Although many configurations of this tool are possible, tool 700 is exemplary and not intended to limit the practice of the present invention. Radioactive fluid density tool 700 contains a radioactive source compartment 702. The radioactive source is inserted in source compartment 702 prior to the logging operation. Once in place, the radioactive source provides a constant emission of radioactive particles. These particles can be either neutron particles or gamma ray particles, as is well known in the art.

While a fluid density tool may contain only a single detector, it is also known to provide compensation for radioactive particle detection by using far and near detectors. In the present invention, far detector 704 is spaced a measured distance away from radioactive source compartment 702, and near detector 706 is spaced a measured distance from source compartment 702 and somewhat closer than far detector 704. Many times, the number of counts emitted from near and far detectors may be greater than the electronics' need to handle. Therefore, one of the first operations is a divide-by scalar for the detectors. As counts leave near detector 706, they are accumulated in near detector divide-by scalar 708 until a certain number of counts accumulate. Sometimes, this scalar may be as little as two, and other times it may be as high as twenty. Once a pre-requisite number of counts have been fed to near detector divide-by scalar 708, a pulse is sent to compensator 712. Likewise, far detector divide-by scalar 710 accumulates a set number of pulses from far detector 704 and sends a signal pulse to compensator 712 when the prerequisite number of counts has been detected.

Compensator 712 provides compensation between the near and far detectors. Depending on the type of source and the configuration, the compensator role can be accomplished in a number of ways. For instance, a scaled number of counts detected by the near detector can be subtracted from the number of counts detected by the far detector. In other instances, compensator 712 may merely provide a ratio of far counts to near counts. In any case, the function of compensator 712 is to provide a meaningful output that is reflective of the fluid type only, and not from any extraneous well bore conditions. Output of compensator 712 is fed to function factor 714. As with most naturally occurring responses, generally, the correlation between density and number of counts, even from a compensated detector array, is probably not linear. Therefore, function factor 714 is used for correlating an exact fluid density to the output of compensator 712. Finally, the output of function factor 714 is fed to time-constant circuit 716.

As is well known in the art, when using nuclear and radioactive tools for logging a well bore, logging speed is important for an accurate determination from radioactive responses. While logging speeds can be increased and decreased within some interval, a time constant must be adjusted accordingly. Normally, the time constant is suggested at the surface by up-hole electronics. In any case, in the present invention, the entire electronics are maintained sub-surface in the logging tool; and therefore, the time constant must be accounted for in the logging tool itself. Finally, the fluid density signal is passed to amplifier 718 and then on to the magnet/drag sub-assembly.

Figure 8A:
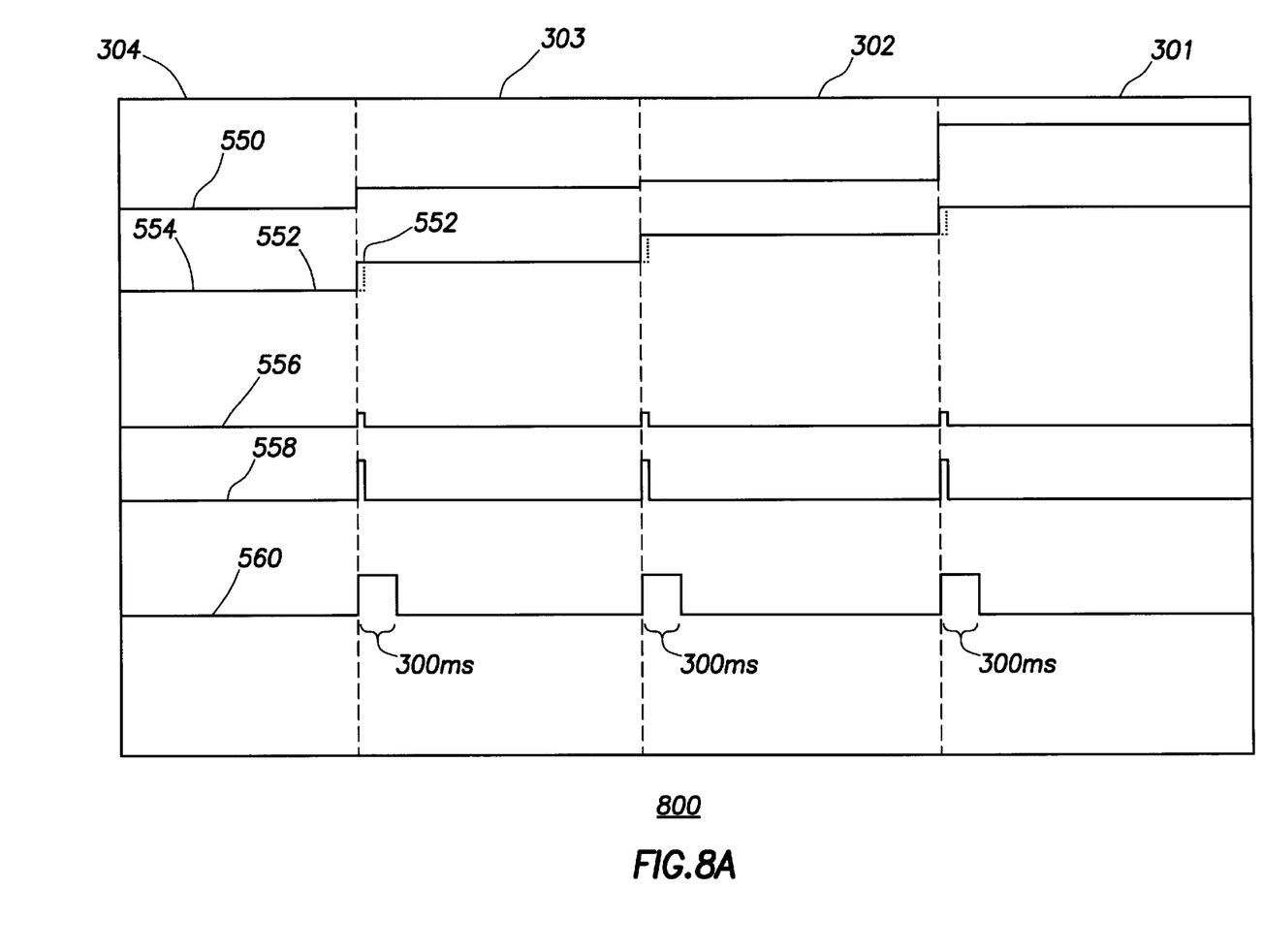
FIG. 8 is a schematic illustrating a timing diagram of the signals within an electronic trigger circuit.

FIG. 8A is a schematic illustrating a timing diagram of the signals within electronic trigger circuit 501 depicted in FIG. 5A. Timing diagram 800 is divided into four zones: 304, 303, 302 and 301, correlating with the zones found in well bores 310, 320 and 330. The output of any of the density tools is shown as timing sequence 550.

Note that, through zone 304, the density stays relatively constant, and then fluid density reduces in the transition between zones 304 and 303. This remains relatively constant until the tool traverses the interface between zones 303 and 302, into the gas and oil mixture zone, and finally into the air field bore hole of zone 301.

Signals 554 and 552 are identical; however, signal 552 is delayed by buffer 508, as shown in FIG. 5. The delay need only be 50 or 100 ms, just enough to activate differential amplifier 510. Differential output signal 556 shows the output of differential amplifier 510. Note that, when signals 552 and 554 have a differential, the output of differential amplifier 510 is slightly increased. The output of differential amplifier 510 is then amplified and conditioned by one shot 512, as shown on signal 558. Switch 514 receives pulses found on signal 558 and switches on electromagnets 502 and 504 for a preset time limit, as shown on signal 560. Note that the interface between each fluid type electromagnets are engaged for approximately 300 ms.

Figure 8B:
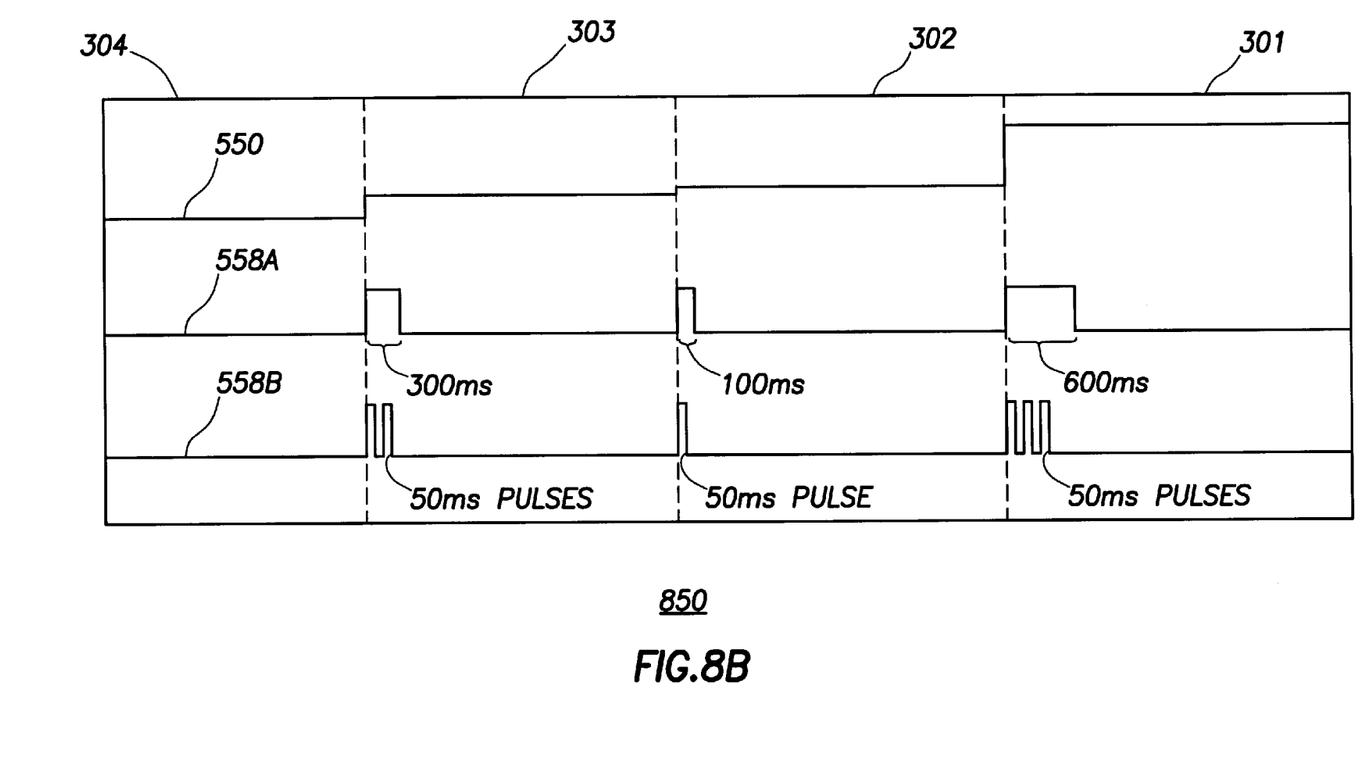

FIG. 8B is a schematic illustrating a timing diagram of the signals within electronic trigger circuit 520 depicted in FIG.

5B. Timing diagram 850 is divided into four zones: 304, 303, 302 and 301, correlating with the zones found in well bores 310, 320 and 330 shown in FIG. 3. The output of any of the density tools is shown as timing sequence 550. Alternatively, signal 550 maybe an output from a combination of tools, each having a specific sensor. Note that, through zone 304, the density stays relatively constant, and then fluid density reduces in the transition between zones 304 and 303. This remains relatively constant until the tool traverses the interface between zones 303 and 302, into the gas and oil mixture zone, and finally into the air field bore hole of zone 301.

In response to the change in either fluid density signal 550 or any other tool sensor signal or combination of tool sensor signals, the programmable I/O amplifier outputs control signals 558A or 558B, depending on the programming. Control signal 558A shows a continuous control signal being output in response to a change in fluid density of sensor signals. The duration of the control signal corresponds to the magnitude of the fluid density change. Conversely, control signal 558B shows groups of control pulses being output, where the number of control pulses corresponds to the magnitude of the fluid density change.

Figure 9:
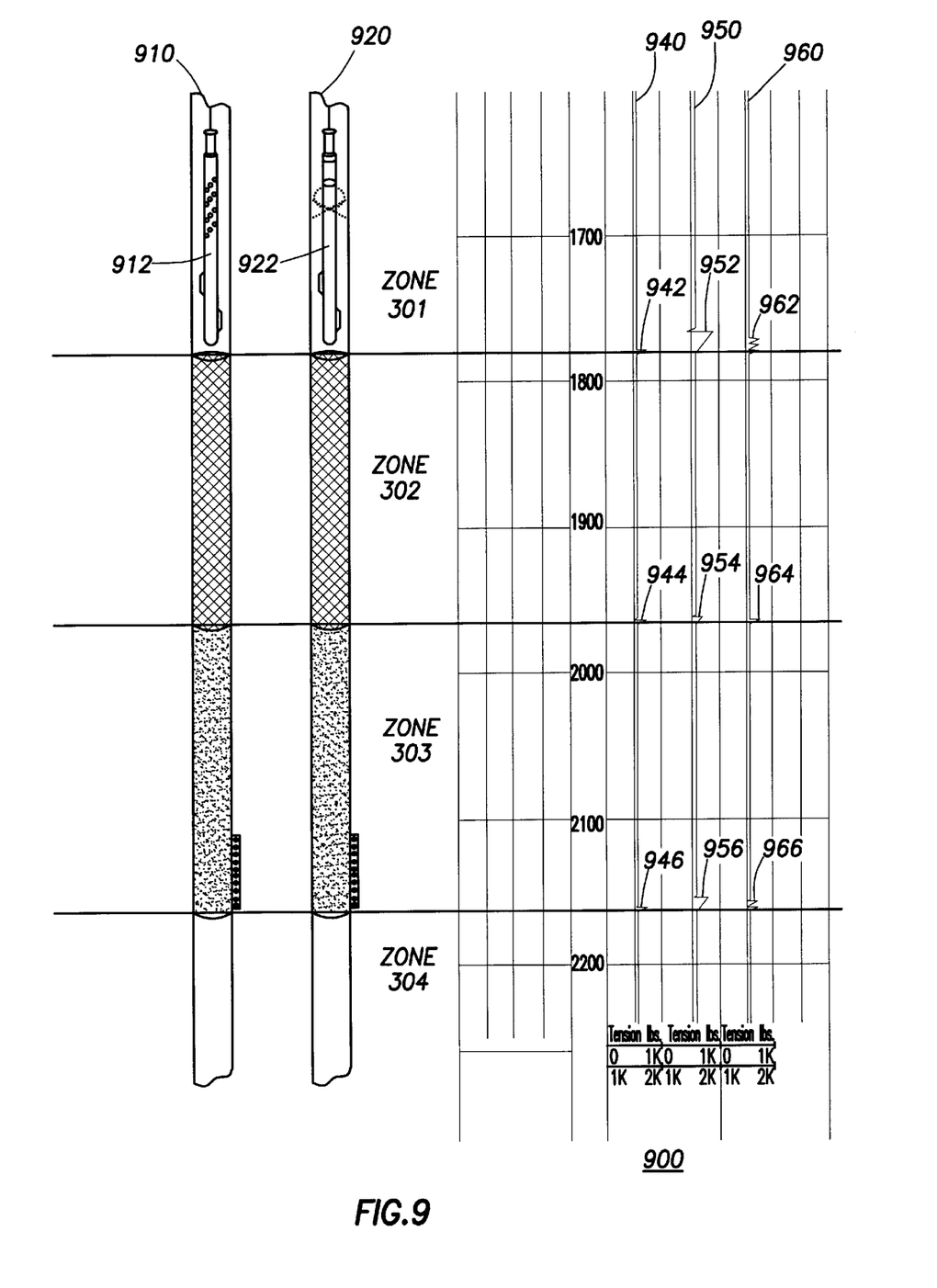
FIG. 9 is a schematic illustrating the correlation between fluids in well bores and the expected indications on a slickline fluid identification log.

FIG. 9 is a schematic illustrating the correlation between fluids in well bores 910 and 920, and the expected indications on a slickline fluid identification log. FIG. 9 is similar to FIG. 3 in that well bores 910 and 920 are identical, having four zones, zone 301 being air, zone 302 being a mixture of soluble gas and oil, zone 303 being crude oil, and zone 304 being contaminated water and drilling mud. In this case, slickline logging tool 912 is a combination of a gradio-monometer and a magnet/drag sub-assembly. Logging tool 922 is a combination of a radioactive fluid density tool and a magnet/drag sub-assembly. Unlike the gauge cutter or blind box, when run on the slickline for fluid identification, gradio-monometer and radioactive fluid density tools are logged up, producing fluid identification traces 940, 950 or 960, depending on the embodiment of the present invention. Here, trace 940 is produced by electronic triggering circuit 502 depicted in FIG. 5A, whereas traces 950 and 960 are produced by alternative programming mode using programmable I/O amplifier 570 in triggering circuit 520 depicted in FIG. 5B.

FIG. 9 further illustrates the correlation between well bore fluids and the indication on log 900. Traces 940, 950 and 960 track cable tension of the slickline tool as it passes through the various well bore fluid zones. Initially, the tension remains constant on all three traces, until the interface of zones 304 and 303, where the tool passes from water to oil. Note at point 946, a spike occurs on tension trace 940 from the magnet/drag sub-assembly response to a signal from the density tool. At that point, magnets on the magnet/drag sub-assembly are activated for 200 to 300 ms. The magnets within the magnet/drag sub-assembly are attracted to the casing wall, and a tension spike occurs on tension trace 940.

In other embodiments, depicted by traces 950 and 960, the character of the traces changes with respect to the density change detected and, further, with respect to programming options selected by the operator. Here, trace 950 shows a longer drag duration in response to the slickline tool passing from water to oil at point 956. Trace 960 show a double spike response at point 966.

At the interface of oil zone 303 and gas soluble oil zone 302, a similar tension spike occurs on trace 940 at point 944, as occurred at point 946. Here, the density tool detects a change in the fluid density and transmits the signal to the magnet/drag sub-assembly, which activates the magnets and provides an indication on tension trace 940. The density change from oil to gas soluble oil is approximately 0.05 to 0.15, whereas the density change from water to oil is on the order of 0.15 gm/cc to 0.25 gm/cc. As expected, the duration of the spike occurring a point 954 on trace 950 is somewhat less than the spike at point 956 due to the programmable response of triggering circuitry 520 on the magnet/drag sub-assembly. Corresponding to oil zone 303 and gas soluble oil zone 302 contact at point 964, a single spike appears on trace 960, again indicating a fluid density transition somewhat less than the oil/water contact logged at point 966.

Finally, as the slickline tool string passes through the last contact, that of gas in an oil solution column and air (zones 301 and 302), a final response is transmitted to the magnet/drag sub-assembly, which instantaneously activates the magnets, which provide an indication at point 942 on tension trace 940. While tension trace 940 does not permit the qualitative identification of the fluid density, as the wireline logging tools do, it does show each individual interface. Knowing the individual interfaces, a skilled reservoir engineer using known parameters from field data, such as the specific gravity of the oil, gas to oil ratios, and the formation fluids, could accurately calculate a hydrostatic head at the top of perforations and, thus, be able to better estimate the amount of gas in place.

However, unlike the responses logged on trace 940, the tensions spikes on traces 950 and 960 are quantitative responses, which not only indicate that a fluid contact exists at points 952 and 962 on traces 950 and 960, respectively, but also give a relative indication as to the magnitude of the change in fluid density. Not that the tension spike occurring at point 952 is much longer in duration than either of the spikes at points 944 and 942. Similarly, there are three tension spikes at point 962 on trace 960, indicating a density transition relative to the number of spikes at either point 964 or 962.

One of ordinary skill in the art will realize that other programmable outputs to sensor responses are possible, such as a preset drag duration in response to predetermined measured fluid density, say 100 ms drag for each 0.10 gm/cc of fluid after a transition or contact over 0.10 gm/cc is detected. For example, at a water/oil contact, the magnet would engage for approximately 0.7 to 0.8 seconds, corresponding to 0.7 to 0.8 gm/cc density of oil.

What is claimed is:

1. A down hole slickline tool and system for identifying fluid in a well bore, comprising:

a fluid sensing component for sensing at least one fluid property and transmitting a data signal containing information describing the sensed at least one fluid property;

an electronic circuit for receiving the data signal and transmitting a control signal based on the data signal; and a magnet drag component for receiving the control signal and activating an electromagnet based on the control signal.

2. The down hole slickline tool and system recited in claim 1, wherein the fluid sensing component responds to at least one of resistance, capacitance, inductance, acoustics, radiation, pressure, magnetic field, electric field, and electromagnetic field.

3. The down hole slickline tool and system recited in claim 2, wherein the fluid sensing component comprises at least two of resistance, capacitance, inductance, acoustics, radiation, pressure, magnetic field, electric field, and electromagnetic field response sensors.

4. The down hole slickline tool and system recited in claim 1, wherein the fluid sensing component comprises logic for analyzing the data signal and generating the control signal.

5. The down hole slickline tool and system recited in claim 1, wherein the fluid sensing component comprises programmable logic for analyzing the data signal and generating a plurality of control signals based on identical or differing data signals.

6. The down hole slickline tool and system recited in claim 1, wherein the magnet drag component is attracted to a well bore lining, causing an increase in cable tension, and the slickline tool and system further comprising:

surface cable tension detection equipment for detecting cable tension at the surface, wherein the cable tension is indicative of both cable and tool weight and fluid identity in the well bore.

7. The down hole slickline tool and system recited in claim 1 further comprises:

an electronic logging computer for creating a well log, wherein the well log includes fluid identity representations.

8. A down hole slickline tool string for identifying fluid in a well bore, comprising:

a sensing tool for sensing fluid properties and transmitting a data signal containing information describing the sensed properties; and a magnet drag tool for receiving the data signal and activating an electromagnet based on the data signal.

9. A fluid identification well log for identifying fluid in a well bore, comprising:

a plurality of grid traces comprising horizontal grid demarcations related to depth; and at least one trace related to cable tension, wherein the trace also comprises indications of fluid identity in the well bore hole, wherein said trace is developed from data received from a sensing tool for sensing fluid properties and transmitting a data signal containing information describing the sensed properties; and a magnet drag tool for receiving the data signal and activating an electromagnet based on the data signal.

10. A method for identifying fluid in a well bore using a slickline, comprising:

sensing at least one fluid property in a wellbore; and transmitting an indication of the fluid property to the surface using a slickline, wherein the transmission occurs in near-realtime to sensing the at least one fluid property and wherein the at least one fluid property is developed using data received from a sensing tool for sensing fluid properties and transmitting a data signal containing information describing the sensed properties; and a magnet drag tool for receiving the data signal and activating an electromagnet based on the data signal.

11. A method for identifying fluid in a well bore using a slickline, comprising:

sensing at least one fluid property in a well bore;

describing the sensed at least one fluid property as a data signal;

transmitting a data signal containing information to a magnet drag assembly;

activating an electromagnet based on the data signal.

* * * * *